(12) United States Patent
Hills et al.

(10) Patent No.: US 9,850,176 B2
(45) Date of Patent: Dec. 26, 2017

(54) METHODS FOR INCREASING AGGREGATE HARDNESS, HARDENED AGGREGATE, AND STRUCTURES INCLUDING THE HARDENED AGGREGATE

(71) Applicant: Advanced Concrete Technologies, LLC, Orem, UT (US)

(72) Inventors: Dal N. Hills, Midway, UT (US); Jeffrey L. Koebrick, St. Augustine, FL (US)

( * ) Notice: Subject to any disclaimer, the term of this patent is extended or adjusted under 35 U.S.C. 154(b) by 0 days.

(21) Appl. No.: 14/736,233

(22) Filed: Jun. 10, 2015

(65) Prior Publication Data

US 2015/0353432 A1 Dec. 10, 2015

Related U.S. Application Data

(60) Provisional application No. 62/010,425, filed on Jun. 10, 2014.

(51) Int. Cl.
| | | |
|---|---|---|
| *C04B 20/10* | (2006.01) | |
| *C04B 41/50* | (2006.01) | |
| *C04B 20/12* | (2006.01) | |
| *C04B 26/26* | (2006.01) | |
| *C04B 28/02* | (2006.01) | |

(52) U.S. Cl.
CPC .......... *C04B 41/5024* (2013.01); *C04B 20/12* (2013.01); *C04B 26/26* (2013.01); *C04B 28/02* (2013.01); *C04B 41/50* (2013.01)

(58) Field of Classification Search
CPC ....... C04B 20/10; C04B 20/12; C04B 20/023; C04B 40/00; C04B 41/50; C04B 41/5024
See application file for complete search history.

(56) References Cited

U.S. PATENT DOCUMENTS

| | | | | |
|---|---|---|---|---|
| 3,802,899 | A * | 4/1974 | McConnaughay | C04B 18/02 106/283 |
| 4,256,501 | A * | 3/1981 | Banino | C04B 20/1037 106/719 |
| 2010/0104873 | A1 * | 4/2010 | Wang | B01J 21/08 428/406 |
| 2013/0008347 | A1 * | 1/2013 | Hills | C09D 133/08 106/482 |

OTHER PUBLICATIONS

Jo et. al. "Pretreatment with antistripping agents on the asphalt-aggregate bond" Petroleum Science and Technology, 15 (iss 3&4), pp. 245-271 (1997).*
Hardness Table screen capture on Oct. 19, 2016 of https://www.tedpella.com/company_html/hardness.htm.*

* cited by examiner

*Primary Examiner* — Nathan Empie
(74) *Attorney, Agent, or Firm* — Durham Jones & Pinegar, P.C. Intellectual Property Law Group

(57) ABSTRACT

Methods for increasing the hardness of aggregate include applying a hardener to the aggregate. The hardener may react with a material of the aggregate and/or a material on a surface of the aggregate. For example, an alkali metal silicate, such as lithium polysilicate, or a colloidal silica may chemically react with calcium oxide and/or calcium hydroxide of an aggregate or on an aggregate to create cementitious material, which may at least partially fill pores in the surface of the aggregate, harden an existing microtexture of the aggregate and/or enhance the microtexture of the aggregate. These characteristics may enhance frictional characteristics, the wear characteristics and the durability of the aggregate, and of any structures formed from composite materials that include the aggregate.

14 Claims, 2 Drawing Sheets

METHODS FOR INCREASING AGGREGATE HARDNESS, HARDENED AGGREGATE, AND STRUCTURES INCLUDING THE HARDENED AGGREGATE

CROSS-REFERENCE TO RELATED APPLICATION

A claim for the benefit of priority to the Jun. 10, 2014, filing date of U.S. Provisional Patent Application No. 62/010,425, titled METHODS FOR INCREASING AGGREGATE HARDNESS, HARDENED AGGREGATE, AND STRUCTURES INCLUDING THE HARDENED AGGREGATE ("the '425 Provisional Application") is hereby made pursuant to 35 U.S.C. §119(e). The entire disclosure of the '425 Provisional Application is hereby incorporated by reference.

TECHNICAL FIELD

Generally, this disclosure relates to methods for preparing aggregate for use in construction materials, such as concrete, asphalt and the like. More specifically, this disclosure relates to methods in which aggregate is treated to increase its hardness. Additionally, hardened aggregates are disclosed, as are structures that include hardened aggregates.

RELATED ART

Aggregates provide structure to construction materials, such as concrete and asphalt. Since aggregates are rocks, the sizes of individual pieces of aggregate may vary from one piece of aggregate to another. Techniques such as crushing have been used to decrease the size of aggregate, while screening processes have been used to separate aggregate into different sizes and, thus, to provide some uniformity in aggregate size.

The hardness of an aggregate is typically defined as soft, medium soft, medium, medium hard and hard. Aggregates that are especially hard may be categorized as "very hard" or "critically hard." On the Mohs hardness scale, soft aggregates have a hardness of about 2 to about 3; medium soft aggregates have a hardness of about 4; medium aggregates have a hardness of about 5; medium hard aggregates have a hardness of about 6; and hard aggregates have a hardness of about 7 or more. The Mohs hardness of very hard/critically hard aggregates is about 8 or more.

The hardness of an aggregate depends primarily upon its composition. By way of example, limestone aggregates are generally soft to medium soft in hardness; dolomite, sandstone and marble aggregates are typically medium soft to medium; granites, some basalt and some river rocks are often medium hard; and many river rocks (e.g., gravels, etc.), basalt and quartz are considered to be hard. Aggregates that are formed from flint, chert and some basalt are also considered to be hard, very hard and/or critically hard.

The size, hardness and other characteristics of the aggregate used in a particular construction material may depend upon any combination of a variety of factors, including, without limitation, the location in which the construction material is mixed (i.e., a source), the location in which the construction material is to be used (i.e., a work site), the type of structure to be formed from the construction material, as well as other factors.

The hardness of aggregate from natural sources depends primarily upon the type or types of rock present in proximity to an area where the aggregate is to be used. Thus, the hardness of aggregate is often a function of geographic location. In many areas, concrete, asphalt and other materials include aggregate from a nearby location, as the costs associated with transporting aggregate over long distances can become prohibitive. Oftentimes this results in structures that include aggregate that is undesirably soft—particularly in locations where the locally obtained aggregate is soft.

When aggregate is used in pavement, the aggregate can enhance the macrotexture and the microtexture of the pavement. This is particularly true with asphalt, where the aggregate provides the majority, if not all, of the macrotexture and microtexture.

Macrotexture is the visible (to the naked eye) texture of a pavement surface. Macrotexture may impart the top of the transportation surface with skid resistance. In addition, the macrotexture may provide recesses and channels that enable liquids (e.g., water, etc.) to flow off of and away from the transportation surface. The macrotexture of a transportation surface may prevent the collection, or pooling, of liquids on surfaces where friction (e.g., with the tires of vehicles traveling across the transportation surface, etc.) is desired and, thus, may reduce hydroplaning and enable the transportation surface to maintain its frictional characteristics in wet weather conditions.

Microtexture typically includes the fine roughness features on the aggregate of a transportation surface, as well as smaller particles, such as fine sands. These features are often barely, if at all, visible to the naked eye. The fine roughness features of microtexture provide the majority of the friction (i.e., skid resistance) that is usually desired on transportation surfaces.

Over time, weather, use and a variety of other factors reduce the microtexture of transportation surfaces and the aggregate of the materials from which the transportation surfaces are formed, diminishing the overall quality of the aggregate and the transportation surfaces. As vehicles travel over transportation surfaces, their tires generate friction that polishes the aggregate and that causes the transportation surfaces to wear. In addition to wearing the transportation surface and polishing the aggregate, small pieces of rubber that are worn from the tires and other debris become trapped in fine roughness features of the microtexture, further smoothing or polishing the aggregate and, thus, further reducing the skid resistance of the pavement. Transportation surfaces that are exposed to heavy loads, heavy traffic, harsh conditions (e.g., extremes in weather, prolonged periods of snow and/or ice, etc.), etc., wear particularly quickly, with softer aggregates being polished more quickly than harder aggregates.

A variety of techniques have been developed to recondition transportation surfaces that have lost desirable amounts of microtexture, macrotexture or skid resistance. Among these techniques are mechanical condition processes, such as diamond grinding, micro-milling and shot blasting, which may be conducted alone or be accompanied by chemical treatments, the use of asphalt-based surface treatments and the use of Portland cement-based surface treatments. The use of these processes is limited by a variety of factors, including weather conditions. Asphalt-based surface treatments cannot be used when temperatures (including overnight temperatures) dip below 50° F. (i.e., about 10° C.). Portland cement-based surface treatments cannot be used when temperatures (including overnight temperatures) dip below freezing. Consequently, these processes typically cannot be used during the late fall, winter and early spring in most parts of the United States and many parts of the world—times of the year when loss of microtexture and skid resistance can pose the greatest threat of danger on paved surfaces.

DISCLOSURE

Figure 1:
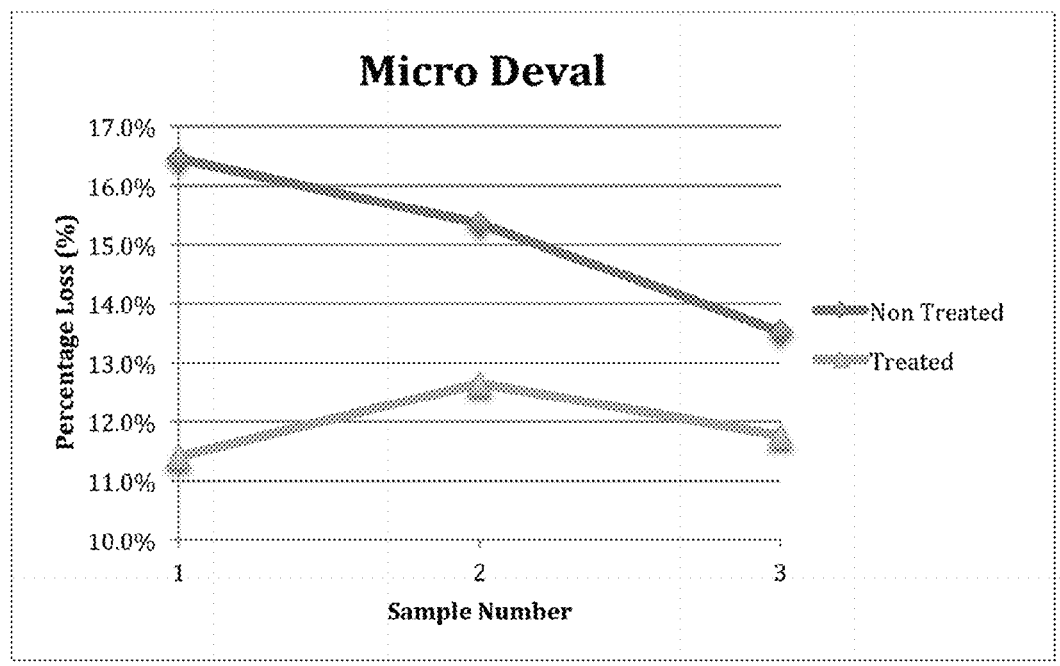
FIG. 1 is a graph showing the results of Micro Deval testing on untreated aggregate and on aggregate treated with a hardener and/or densifier.

This disclosure relates to the treatment of aggregate to increase its hardness or resistance to surface wear. In various aspects, methods of treating aggregate are disclosed, as are treated aggregate, materials including treated aggregate and pavement formed by materials including treated aggregate.

Various types of aggregate may be treated in accordance with this disclosure. Without limitation, the disclosed processes may be used to increase the hardness of soft aggregates and medium aggregates. Some non-limiting examples of soft and medium aggregates that may be treated in accordance with this disclosure include dolomite, soft and medium limestone and soft granite.

A method for treating aggregate to increase its hardness or resistance to surface wear includes applying a hardener to the aggregate. The hardener may comprise a material that hardens inorganic materials; for example, a material that reacts with inorganic material of the aggregate (e.g., on a surface of a piece of the aggregate, at the surface of a piece of the aggregate, accessible from to the surface of the piece of aggregate, etc.) in a manner that increases a hardness of the inorganic material and, thus, increases a hardness of the aggregate. Some non-limiting examples of materials with which a hardener may react include calcium oxide (CaO), or so-called "quicklime," and calcium hydroxide ($Ca(OH)_2$), or so-called "slaked lime." Suitable hardeners for reacting with such materials include, but are not limited to, alkali metal silicates (e.g., lithium polysilicate, potassium silicate, sodium silicate, etc.) and colloidal silica, which may also be considered to be a type of alkali metal silicate. In some embodiments, the hardener, when in liquid form, may have a pH of 10 or less, or even a pH of 8 or less.

A specific example of a hardener includes the H&C Clear Liquid Hardener & Densifier available from the Sherwin-Williams Company of Cleveland, Ohio, which is a colloidal silica-based hardener/densifier. Another specific example of a hardener is the lithium polysilicate-based hardener/densifier marketed as PENTRA-SIL (HD) by Convergent Concrete Technologies, LLC, of Orem, Utah.

Application of the hardener may be effected before the aggregate is washed. When the hardener is applied prior to washing the aggregate, the hardener may react with material of the aggregate and with material on the surfaces of the pieces of aggregate (e.g., dust particles that remain from mining and/or crushing processes, etc.). Once the hardener has reacted with material of the aggregate or with material on the aggregate, the aggregate may be subjected to further processing, such as washing.

The hardener may be applied as part of the washing process. In some embodiments, dust, dirt and other materials on the surfaces of the pieces of aggregate may be at least partially removed from the aggregate with a solution that includes a hardener. Alternatively, the hardener may be applied to aggregate immediately after washing, before the aggregate has dried.

As another option, the hardener may be applied to aggregate after the aggregate has been washed, or once all other processing (e.g., crushing, screening, washing, drying, etc.) of the aggregate is complete.

The hardener may be applied to the aggregate in any suitable manner. Some non-limiting examples of the manner in which the hardener may be applied to aggregate include spraying a liquid (e.g., aqueous, etc.) hardener onto the aggregate, soaking the aggregate in a liquid hardener and immersing the aggregate in a volume of liquid hardener.

As indicated previously, once the hardener has been applied to the aggregate, the hardener may be allowed to penetrate at least partially into an interior of the aggregate, and to react with material of the aggregate, as well as material on surfaces of the aggregate. In particular, the hardener may bind in a pozzolanic fashion to lime (e.g., calcium oxide (CaO), or so-called "quicklime"; calcium hydroxide ($Ca(OH)_2$), or so-called "slaked lime"; etc.) on the aggregate or accessible from surfaces of the aggregate to create cementitious material on the surface of aggregate, thereby increasing a hardness and a strength of the aggregate, or, at least, increasing a hardness and a strength of a surface of the aggregate. A liquid hardener may be permitted to dry.

In some embodiments, reaction of the hardener with material of or on the aggregate may be enhanced by exposing the aggregate and/or the hardener to an elevated temperature. In various embodiments, the aggregate and/or the hardener may be heated to a temperature that exceeds ambient temperature (e.g., a temperature of greater than 25° C., etc.), but is less than the boiling point of water (e.g. a temperature of less than 100° C., etc.). More specifically, the aggregate and/or the hardener may be heated to a temperature of about 60° C. to about 95° C. or, even more specifically, to a temperature of about 75° C. to about 95° C. Without limiting the scope of this disclosure, aggregate may be heated to an elevated temperature before applying the hardener to the aggregate (e.g., by introduction into a dryer, a furnace, etc.). The hardener may be heated before it is applied to the aggregate. As another option, aggregate with the hardener thereon may be heated (e.g., by introduction into a dryer, a furnace, etc.). Exposure of the hardener and the aggregate to an elevated temperature may enable the hardener to penetrate further into the aggregate, and may increase the rate of reaction between the hardener and material on and/or accessible from the surface of the aggregate.

The chemical reactions that occur while applying a hardener to aggregate may harden a microtexture of the aggregate, enhance a microtexture of the aggregate and/or reduce a porosity of the aggregate. Hardening and enhancing the microtexture of the aggregate may render the microtexture of the aggregate less susceptible to wear or degradation, enabling the aggregate to withstand frictional stresses (e.g., traffic, heavy loads, etc.) for prolonged periods of time. In addition, hardening and/or densifying the aggregate may maintain an angularity of the aggregate (i.e., prevent rounding of the aggregate), which contributes to, and thus maintains, the macrotexture of the aggregate and of a transportation surface at least partially defined by the aggregate.

Reducing the porosity of aggregate may reduce the likelihood that the aggregate will absorb contaminants (e.g., tire rubber, oil, dirt, etc.) that may mask the microtexture of the aggregate or otherwise effectively the microtexture. In addition, a decrease in the porosity of aggregate may render the aggregate less susceptible to microfractures, fractures and cracking, as may occur when the aggregate is stressed and or subjected to the elements (e.g., freezing, repeated freeze-thaw cycles, etc.), and the resultant damage to materials and structures of which the aggregate is a part. Reducing the likelihood that aggregate will incur cracks and fractures, or increasing the fracture resistance of the aggregate, may, therefore, prevent reductions in the angularity of the aggregate, or rounding of the aggregate, along with reduced surface texture (e.g., macrotexture, etc.).

In embodiments where a hardener is applied to soft aggregate, its hardness may be increased from a 3 or 4 on the Mohs hardness scale (soft) to a hardness of 5 (medium) or 6 (medium hard). Similarly, aggregate with a hardness of 5 (medium) may be hardened to a 6 (medium hard) or 7 (hard) on the Mohs hardness scale. In some embodiments, the hardness of medium hard and hard aggregates may also be increased by employing teachings of this disclosure.

The following EXAMPLES demonstrate some of the effects of application of a hardener and/or densifier to aggregate.

EXAMPLES

Three replicates of non-treated limestone aggregates and densifier-treated aggregates were subjected to Micro Deval and aggregate imaging system (AIMS) testing to determine if the chemical treatment enhances aggregate abrasion resistance, hardness and durability. The Micro Deval test provided weight loss measurements. Both pre- and post-Micro Deval aggregate particles were collected and analyzed for angularity using AIMS.

Aggregate samples were washed and oven dried to a constant temperature, then submerged into a lithium-based densifier (e.g., PENTRA-SIL (HD) hardener/densifier, available from Convergent Concrete Technologies, LLC) and agitated for 60 seconds to ensure as much uniformity in application as possible. The samples were then removed from the densifier and left to air dry for 24-48 hours. Testing was then initiated.

The preliminary Micro Deval results are shown in FIG. 1, with the percentage weight loss represented on the y-axis. These results reveal that the aggregate samples with directly applied lithium silicate densifier (triangle designation) had less weight loss than the non-treated samples (diamond designation). Good friction performance has been correlated with aggregates that exhibit Micro Deval weight loss values of 12% or less. Therefore, the results indicate that the treated aggregate would facilitate good pavement surface friction and better performance than the non-treated aggregate.

Figure 2:
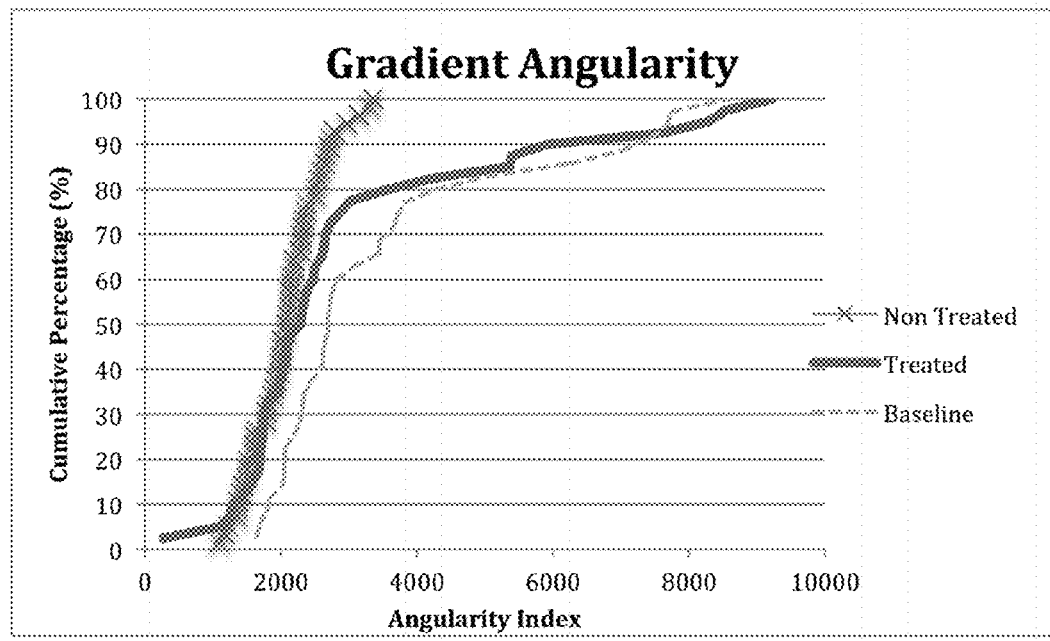
FIG. 2 is a graph showing the angularity of untreated aggregate and of aggregate treated with a hardener and/or densifier before and after Micro Deval testing, as determined by aggregate imaging system (AIMS) analysis.

Preliminary AIMS results show that applying the lithium silicate densifier directly to the aggregate also enhances the ability of the aggregate to retain angularity. FIG. 2 shows the angularity results (gradient method) from ⅝ inch (16 mm) limestone particle testing, with the cumulative percentage of sample particles represented on the y-axis. In general, an angularity value of 4,000 or above indicates an angular particle, whereas a value below 2,100 indicates a rounded particle.

FIG. 2 shows the angularity values, represented on the x-axis, for (a) pre-Micro Deval particles (baseline, dashed line), (b) densifier-treated particles, post Micro Deval (solid line), and (c) non-treated particles, post Micro Deval (hashed line). The results show that the angularity of the untreated limestone aggregate is greatly reduced after exposure to Micro Deval. Only about 20% of pre-Micro Deval particles were considered rounded. However, the impact of abrasion is apparent in the untreated, post-Micro Deval particles, as most of the particles lost angularity. In contrast, the densifier-treated aggregate trends more closely with the aggregate that received no Micro Deval treatment at all, indicating that the chemical application does indeed enhance aggregate abrasion resistance and, by extension, skid resistance.

Figure 3:
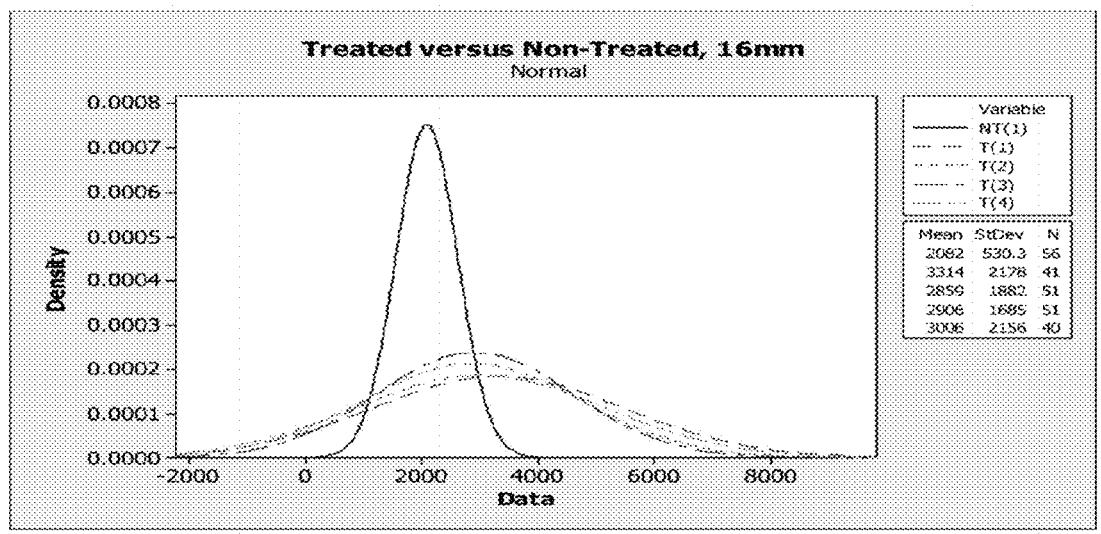
FIG. 3 is another graph showing the angularity of untreated aggregate and of aggregate treated with a hardener and/or densifier, as determined by AIMS analysis.

FIG. 3 shows the descriptive statistics and distributions for the AIMS angularity data for treated (dashed lines) and untreated (solid line) particles. The analysis of variance showed that there was a statistically significant difference ($p=0.009$) between the treated aggregate (more angular) and the untreated aggregate (more rounded) based upon a 95% confidence interval (Tukey's Method). Additionally, there was no difference between treated samples.

There is a correlation between abrasion resistance and polishing resistance, especially for aggregate that is highly susceptible to abrasion like limestone. Essentially, when aggregate angularity is reduced, the aggregate becomes more susceptible to polishing. These results show that lithium silicate densifier application hardens the aggregate and, therefore, enhances the likelihood of inhibiting polishing.

In addition to increasing the wear characteristics of aggregate and the materials and structures of which the aggregate is a part, application of a hardener to aggregate may reduce or eliminate dusting on the aggregate. Reduced dusting may, in turn, enhance adhesion of the aggregate to binders, such as bituminous materials (e.g., asphalt, etc.), epoxies, cements and the like.

The ability of aggregate to adhere to a nonpolar or hydrophobic binder, such as asphalt, an epoxy or another organic material (e.g., pavement marking materials, such as a polyurea, methyl methacrylate (MMA), hydrophobic acrylics and urethanes; etc.), may be further enhanced by applying an antistripping additive, which is also referred to as an adhesion promoter and as a wetting agent, to the aggregate. Antistripping additives include a hydrophilic (i.e., water loving), or polar, portion and a hydrophobic (i.e., water hating), or nonpolar, portion. The hydrophilic, or polar, portion of an antistripping additive interacts with the aggregate. The hydrophobic, or nonpolar, portion of the antistripping additive interacts with the binder (e.g., asphalt, etc.). By enhancing adhesion of the binder to the aggregate, the antistripping additive prevents water molecules from getting between the binder and the asphalt and, thus, from stripping the binder away from the asphalt. Therefore, the antistripping additive preserves the integrity of the asphalt (i.e., asphalt concrete, bituminous mixture, blacktop, tarmac, etc.). Some non-limiting examples of antistripping additives that may be applied to the aggregate include amine-based hydrocarbons (e.g., tallow diamine (TDA), polyamines based on bis-hexamethylene triamine (BHMT), amidoamines, etc.). The antistripping additive may be applied to the aggregate after the harder has been applied to the aggregate and allowed to chemically react with material of the aggregate or material on the aggregate. Application of the antistripping additive may be effected in any suitable manner (e.g., by spraying, soaking, immersing, etc.).

As an alternative to applying the antistripping additive to aggregate after the hardener has been applied to the aggregate, the antistripping additive may be applied to the aggregate concurrently with application of the hardener to the additive. The antistripping agent may even be mixed with the hardener prior to their application to the aggregate. Accordingly, in another aspect, this disclosure relates to compositions that include a mixture of a hardener (e.g., lithium polysilicate, colloidal silica, etc.) and an antistripping additive.

Once the hardener and/or the antistripping additive has been applied to the aggregate, the aggregate may be stored or it may be transported to a site where it is to be mixed with a binder and installed (e.g., as a pavement, etc.).

Once aggregate has been treated in accordance with teachings of this disclosure, the aggregate may be mixed with a binder (e.g., Portland cement, asphalt, an epoxy, etc.) to form a composite material. The composite material may then be used to define a structure, such as pavement structure (e.g., a roadway, a bridge deck, a parking lot, parking deck, a walkway, an overlay for any of the foregoing, etc.) or any other structure. Since the aggregate has been hardened, its durability and wear resistance (including its ability to maintain its microtexture and other frictional characteristics over time) may be enhanced over the durability and wear resistance of comparable unhardened aggregate. Thus, the durability and wear resistance of materials and structures of which the hardened aggregate is a part may exceed the durability and wear resistance of materials and structures that include comparable unhardened aggregate.

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A method for increasing a hardness of aggregate, comprising:
    selecting an aggregate that includes CaO and/or $Ca(OH)_2$; and
    applying a hardener to the aggregate, the hardener reacting with the CaO and/or the $Ca(OH)_2$ at a surface of the aggregate and/or accessible from the surface of the aggregate to increase a hardness of the aggregate by at least one level of the Mohs hardness scale.

2. The method of claim 1, wherein selecting the aggregate comprises selecting a soft aggregate and applying the hardener increases the hardness of the soft aggregate and converts the soft aggregate to a medium aggregate or to a hard aggregate.

3. The method of claim 1, wherein selecting the aggregate comprises selecting a medium aggregate and applying the hardener increases the hardness of the medium aggregate and converts the medium aggregate to a medium hard aggregate or to a hard aggregate.

4. The method of claim 1, wherein applying the hardener comprises washing the aggregate in a solution including the hardener.

5. The method of claim 1, wherein applying the hardener comprises applying the hardener after washing the aggregate.

6. The method of claim 1, wherein applying the hardener comprises enabling the hardener to penetrate into an interior of the aggregate.

7. The method of claim 1, wherein applying the hardener comprises applying a lithium polysilicate to the aggregate.

8. The method of claim 1, wherein applying the hardener comprises applying a colloidal silica to the aggregate.

9. The method of claim 1, further comprising:
    heating at least one of the aggregate and the hardener before applying the hardener to the aggregate and/or after applying the hardener to the aggregate.

10. The method of claim 1, further comprising:
    applying an antistripping additive to the aggregate.

11. The method of claim 10, wherein applying the antistripping additive includes applying the antistripping additive after applying the hardener.

12. The method of claim 11, wherein applying the antistripping additive further includes applying the antistripping additive after the hardener has reacted with a material at or accessible from the surface of the aggregate.

13. The method of claim 10, wherein applying the antistripping additive comprises applying the antistripping additive concurrently with applying the hardener.

14. The method of claim 13, further comprising:
    blending the hardener and the antistripping additive before applying the antistripping additive concurrently with applying the hardener.

* * * * *